(12) United States Patent
Finkle (10) Patent No.: US 6,586,858 B1
(45) Date of Patent: Jul. 1, 2003

(54) DC VOLTAGE POWERED ROTATING BRUSH MOTOR

(76) Inventor: Louis Finkle, 3300 E. 59th St., Long Beach, CA (US) 90805

( * ) Notice: Subject to any disclaimer, the term of this patent is extended or adjusted under 35 U.S.C. 154(b) by 0 days.

(21) Appl. No.: 10/084,699

(22) Filed: Feb. 28, 2002

(51) Int. Cl.[7] .......................... H02K 13/00; H01R 39/06
(52) U.S. Cl. ...................... 310/233; 310/232; 310/237; 439/21
(58) Field of Search ................................ 310/231, 232, 310/233, 237, 229, 219; 439/27, 21; 200/19.09

(56) References Cited

U.S. PATENT DOCUMENTS

| | | | | |
|---|---|---|---|---|
| 2,634,342 A | * | 4/1953 | Baechler | 200/19.09 |
| 2,725,540 A | * | 11/1955 | Scott | 439/21 |
| 2,852,628 A | * | 9/1958 | Fry | 200/19.09 |
| 3,314,038 A | * | 4/1967 | Rutten | 439/21 |
| 3,648,088 A | * | 3/1972 | Wilkin et al. | 310/178 |
| 3,953,095 A | * | 4/1976 | Iino et al. | 439/21 |
| 4,633,731 A | * | 1/1987 | Kurata | 74/492 |
| 4,927,364 A | * | 5/1990 | Inui et al. | 439/15 |
| 5,704,792 A | * | 1/1998 | Sobhani | 439/21 |
| 5,746,606 A | * | 5/1998 | Sobhani | 439/21 |

* cited by examiner

Primary Examiner—Burton S. Mullins
(74) Attorney, Agent, or Firm—Morland C. Fischer (57) ABSTRACT

A DC voltage permanent magnet, rotating brush type motor that is characterized by a high output power-to-weight ratio so as to be particularly suitable for use in an electric vehicle. Efficiency is maximized by commutating the motor mechanically rather than electronically. To this end, the motor includes a stationary double sided commutator assembly having sets of electrically conductive commutator bars extending radially on opposite sides thereof, whereby to increase the current carrying capacity of the commutator assembly. A pair of brush assemblies rotate at opposite sides of the stationary commutator assembly. Each brush assembly includes a lightweight brush holder coupled to the motor shaft by which to carry a plurality of shuntless electrically conductive brushes, whereby the brushes rotate relative to the commutator bars at the opposite sides of the commutator assembly.

20 Claims, 9 Drawing Sheets

DC VOLTAGE POWERED ROTATING BRUSH MOTOR

BACKGROUND OF THE INVENTION

1. Field of the Invention.

This invention relates to a DC voltage powered, rotating brush type motor that has particular application for use in an electric vehicle and is characterized by a high power-to-weight ratio. The motor includes a pair of brush assemblies that rotate relative to a stationary double sided commutator assembly and a pair of slip ring assemblies.

2. Background Art.

Conventional brushless motors are known to have electronic commutation control means that require as many as six semiconductor transistor devices. In this case, the commutator is commonly mounted on and rotatable with the shaft of the motor. The magnetic structure of the motor is part of the stationary stator assembly. In cases where the motor has current conducting brushes, such brushes are typically stationary within the motor housing relative to a rotating commutator assembly. Current from the brushes is carried via shunt wires through relatively long current paths to the field windings which increases impedance and reduces the current carrying capacity of the motor.

The conventional brushless and stationary brush type motors tend to generate excessive heat that requires cooling and results in a loss of efficiency. Because of the mass of the rotor and the rotating commutator assembly coupled thereto, greater energy and time must be consumed before the motor can reach its optimum operating speed. Consequently, the power output of the motor is reduced. In this same regard, when the motor is commutated electronically, the power-to-weight ratio is undesirably decreased and the cost of manufacture is correspondingly increased.

Accordingly, it would be desirable to reduce the mass of the rotor assembly of a DC brush type motor and commutate the motor mechanically rather than electrically so as to increase the power-to-weight ratio and efficiency of the motor by having a stationary commutator assembly with a high current capacity and a rotating brush assembly. Examples of known DC motors that have a rotating brush assembly and a stationary commutator assembly are available by referring to the following United States patents:

| | |
|---|---|
| 2,184,236 | 19 Dec. 1939 |
| 3,555,315 | 12 Jan. 1971 |
| 3,555,328 | 12 Jan. 1971 |
| 4,551,658 | 5 Nov. 1985 |
| 4,949,023 | 14 Aug. 1990 |

SUMMARY OF THE INVENTION

A DC voltage powered rotating brush motor is disclosed having a high power-to-weight ratio and a particular application for use in electric vehicles. The motor has a shaft that rotates a permanent magnet assembly relative to the field windings of the stator assembly. Coupled to the shaft are a pair of brush assemblies that rotate past a stationary double sided commutator assembly and a pair of solid, disc-like slip ring assemblies that are connected to opposite terminals of a DC voltage source.

The stationary double sided commutator assembly includes an electrically insulating support ring. Mounted on opposite sides of the support ring are first and second sets of radially extending, electrically conductive commutator bars. The commutator bars are spaced from one another by a small air gap. Opposing pairs of commutator bars at opposite sides of the a support ring are electrically connected to one another by means of a plurality of assembly screws that are pushed through respective end-to-end aligned channels that extend circumferentially around the commutator assembly and through each of the commutator bars. By virtue of the double sided arrangement of commutator bars, the current carrying capacity of the commutator assembly can be effectively doubled.

Located at each side of the stationary commutator assembly is a rotating brush assembly. The brush assemblies are electrically insulated from and aligned out of phase with one another adjacent the first and second sets of electrically conductive commutator bars. Each brush assembly includes a brush holder having three arms that project radially outward from a hub. The brush assemblies are mounted on and rotatable with the shaft of the motor by way of the hubs thereof. Flat, solid and generally triangular electrically conductive shuntless brushes are slidably received within brush cavities formed in the arms of each brush holder.

A stationary disc-like slip ring assembly is located outside each rotating brush assembly. The slip ring assemblies are biased by slip ring retention springs so as to exert a pressure against and thereby urge the brushes of the brush assemblies into constant electrical contact with the opposing first and second sets of commutator bars of the stationary double sided commutator assembly. Each slip ring assembly has an electrical terminal that projects radially from an electrically conductive slip ring body to be connected to one terminal of the DC voltage source. The slip ring terminals are electrically connected to the field windings of the motor and to the first and second set of commutator bars of the commutator assembly by means of the aforementioned plurality of assembly screws that also run through holes which extend circumferentially around the slip ring assemblies.

DETAILED DESCRIPTION

Figure 1:
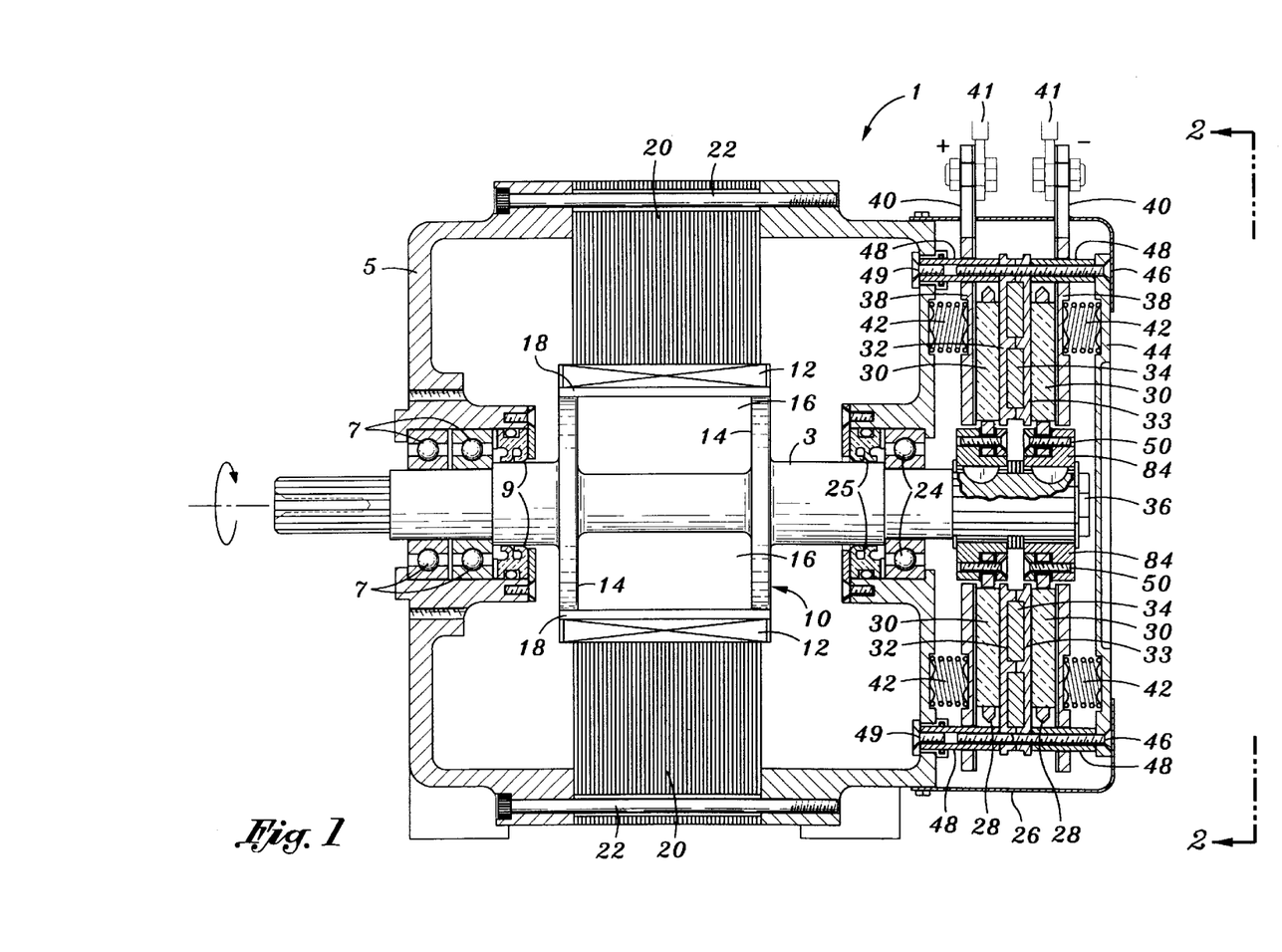
FIG. 1 is a cross-section of the DC voltage powered rotating brush motor which forms the present invention.
Figure 2:
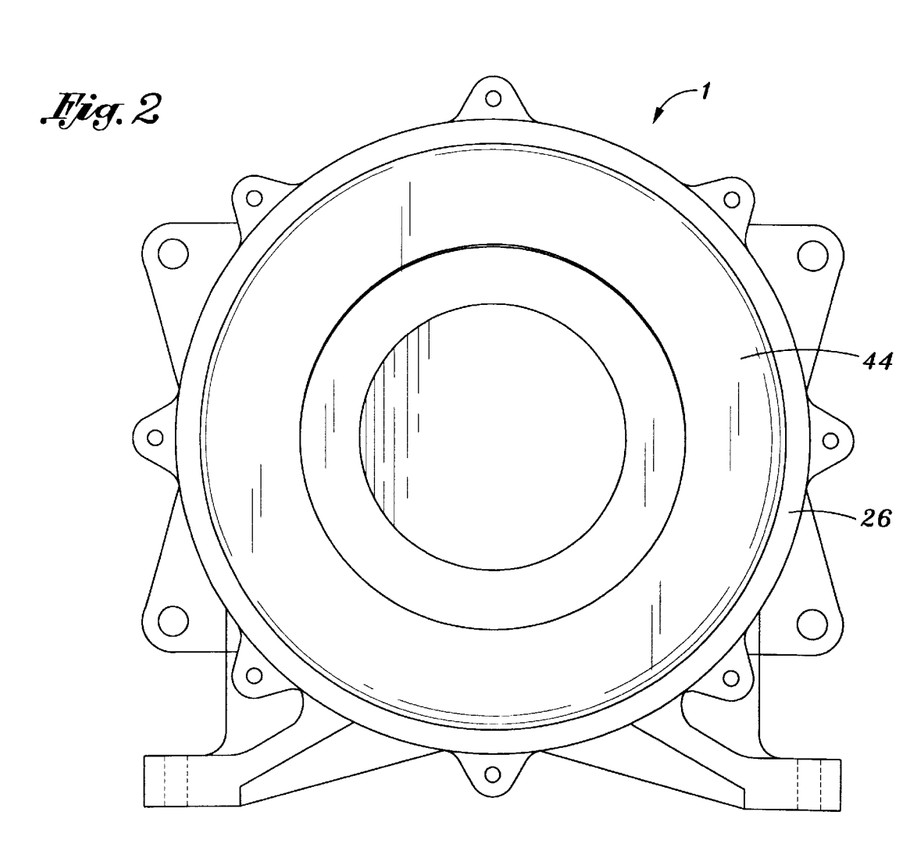
FIG. 2 is an end view taken along lines 2—2 of the DC motor shown in FIG. 1.

The DC voltage powered, rotating brush motor 1 which forms the present invention is now described while referring initially to FIGS. 1 and 2 of the drawings. The motor of this invention is manufactured so as to be lightweight and small in size (approximately 18 inches long and approximately 10 inches in diameter). Because of its soon to be described improvements, the motor 1 can reach a very high horse power (e.g. 3000 HP) for a short period of time so as to have particular application for use in an electrical vehicle. The motor 1 includes a rotatable shaft 3 which is preferably manufactured from a lightweight (e.g. titanium) metal. The shaft 3 of motor 1 is supported at one end thereof by a bearing supporting end casing 5 that may be cast or machined from aluminum, or the like. The end casing 5 carries a plurality of shaft supporting ball bearings 7 and seals 9 which establish a flow path to permit the motor 1 to be water cooled. Located opposite the bearing supporting end casing 5 is a commutator supporting casing 26 that surrounds an outer end wall 4 and encloses the motor shaft 3.

The rotor assembly 10 of motor 1 is carried on the shaft 3. The rotor assembly 10 includes rare earth permanent magnets 12. As one unique feature of this invention, the permanent magnets 12 are an integral part of the rotor assembly 10 so as to be capable of rotating with the shaft 3. Such a magnetic structure has traditionally been part of the stationary stator assembly that surrounds the shaft 3 of conventional motors. The permanent magnets 12 are connected to the shaft 3 by means of a pair of disc-like rotor supports 14 that are spaced from one another to establish an empty cavity 16 at the center of rotor assembly 10. As another unique feature of this invention, the empty cavity 16 between the shaft 3 and rotor supports 14 reduces the weight coupled to the shaft 3 so that the motor 1 can more quickly reach its operating speed. The rotor assembly 10 also includes a back iron 18 secured to the rotor supports 14 below permanent magnets 12. The back iron 18 forms a return path for the magnetic flux that is produced during motor operation.

The stator assembly of motor 1 includes the usual electromagnetic field windings 20 that surround the rotor assembly 10. The stator windings are fixedly attached to the bearing supporting end casing 5 by means of long bolts 22.

The other end of the shaft 3 of motor 1 is supported by ball bearings 24 and seals 25. The seals 25 cooperate with the seals 9 at the opposite end of the shaft 3 to establish a water flow path by which to cool the motor 1 and dissipate heat, particularly that generated by the windings 20 of the stator assembly.

Figures 5, 6:
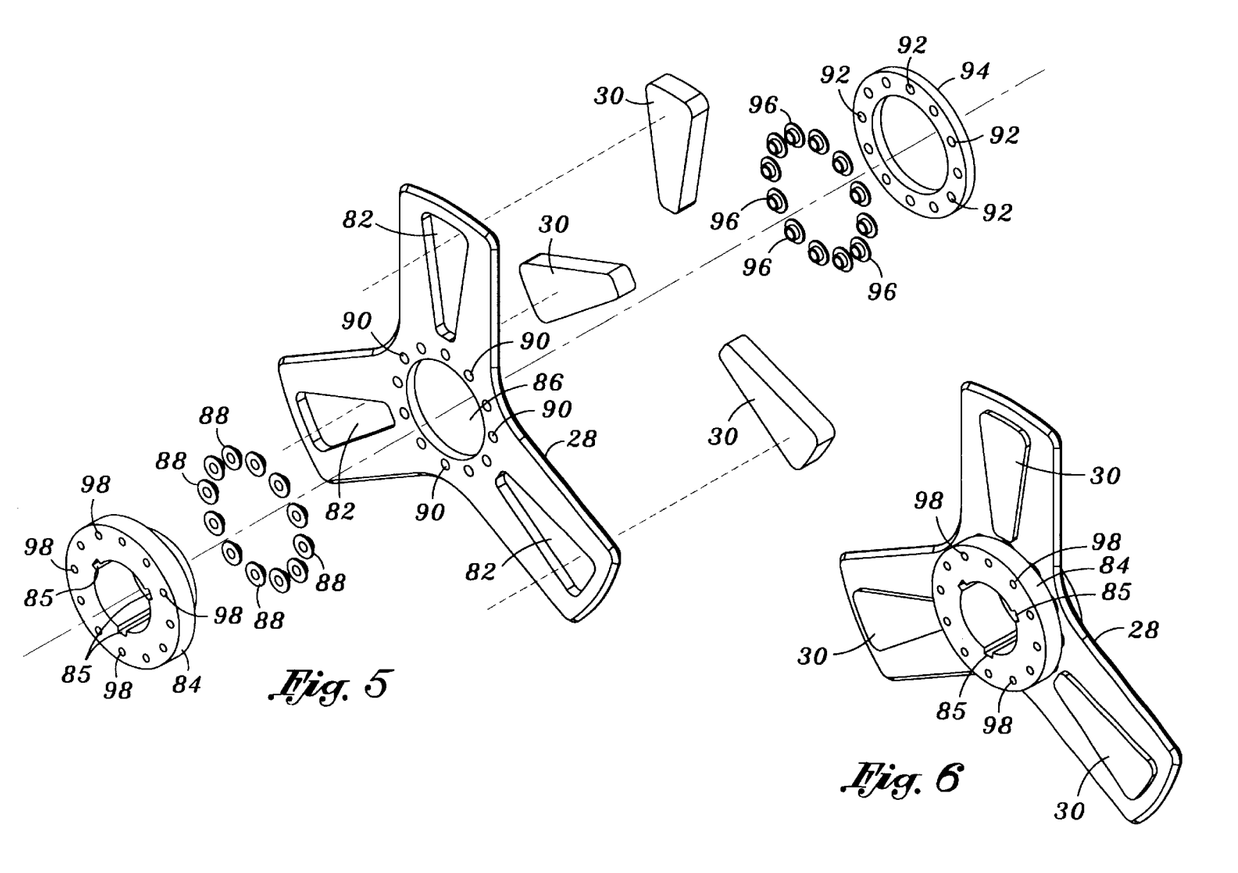
FIG. 5 is an exploded view of one of the brush assemblies of the DC motor which forms the present invention.
FIG. 6 shows the brush assembly of FIG. 5 in the assembled configuration.

As will be disclosed in greater detail hereinafter, the motor 1 includes a pair of brush assemblies that rotate relative to a stationary commutator assembly. Each rotating brush assembly includes a brush holder 28 that carries three brushes 30 (best shown in FIGS. 5 and 6). The brush holders 28 are located at opposite sides of the stationary commutator assembly which includes first and second sets of electrically conductive commutator bars 32 and 33 that are mounted on opposite sides of an insulating commutator support ring 34 (also best shown in FIGS. 5 and 6). A locking screw 36 preserves the relationship of the commutator bars 32 and 33 at opposite sides of the commutator support ring 34.

Figure 4:
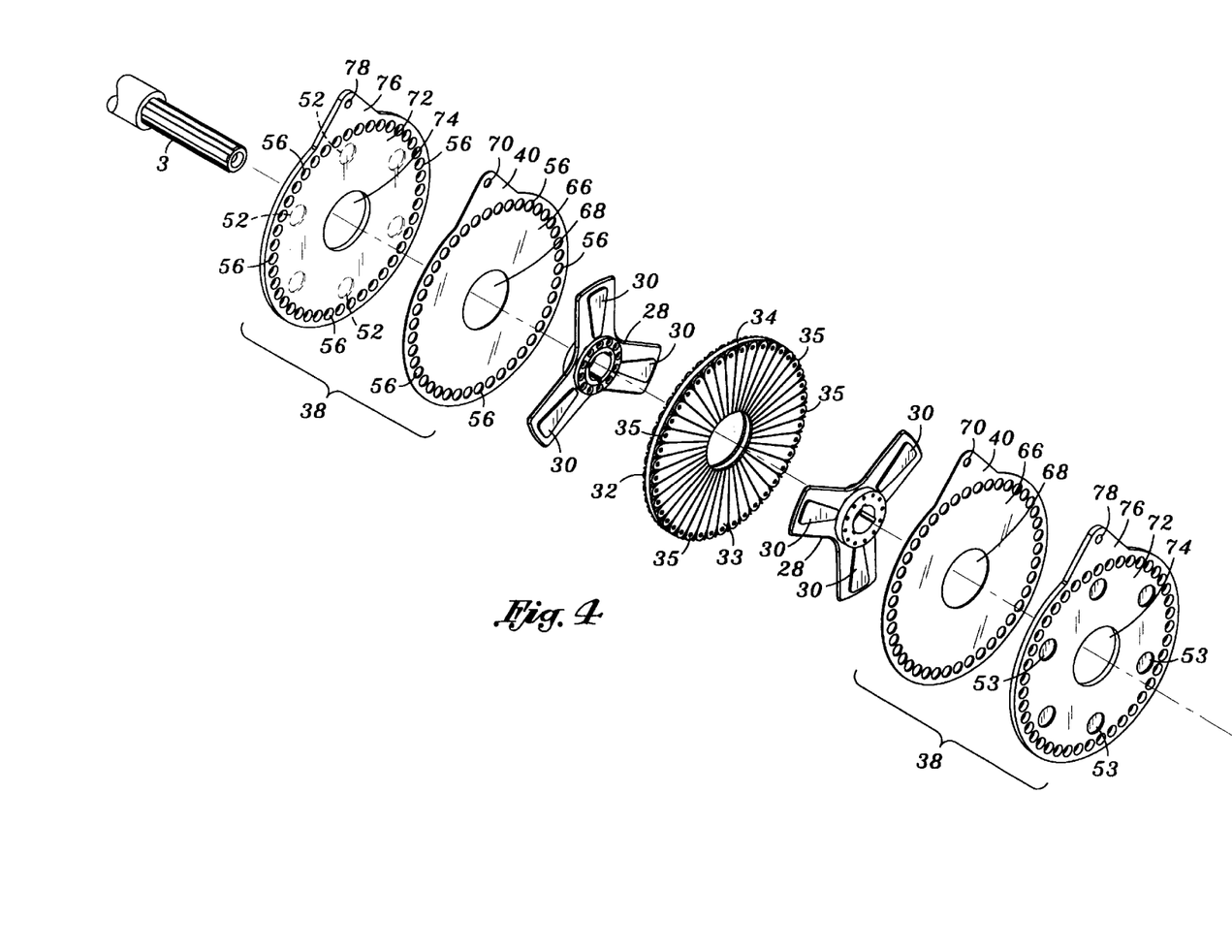
FIG. 4 is an exploded view showing the face-to-face arrangement of the commutator, brush and slip ring assemblies of the DC motor of FIG. 1.

Located outside and surrounding the rotating brush and stationary commutator assemblies of motor 1 are a pair of solid, electrically conductive (e.g. copper) slip rings 38. As is best shown in FIG. 4, each of the slip rings 38 has an electrical terminal 40 formed at its radially outermost point. The slip ring terminals 40 are adapted to be connected to respective opposite terminals 41 of a source of DC voltage (not shown). A set of slip ring tension springs 42 apply pressure against the slip rings 38 to hold the slip rings in constant contact against the rotating brushes 30 of the brush assemblies to compensate for brush wear during motor operation.

In order to carry DC power from the terminals 40 of slip rings 38 to the field windings 20 of motor 1 while maintaining a face-to-face relationship of the commutator, brush and slip ring assemblies, pairs of hollow, electrically conductive (e.g. copper) bars 48 are aligned end-to-end one another between the outer end wall 44 within the commutator support casing 26 of motor 1 and the bearing supporting end casing 5 adjacent the ball bearings 24 and seals 25. As will be disclosed in greater detail when referring to FIGS. 3 and 4, respective pairs of end-to-end aligned conductor bars 48 extend through circumferentially aligned apertures (designated 56 in FIG. 4) that are positioned around each of the outer slip rings 38 and electrically insulated apertures (designated 58 in FIG. 3) in the end casing 5. Outside assembly screws 46 extend from outer end wall 44 and through the pair of hollow conductor bars 48 via circumferentially aligned apertures (designated 35 in FIG. 10) that are positioned around the opposing sets of commutator bars 32 and 33 of the commutator assembly. Tabbed assembly screws 49 extend through the aforementioned apertures 58 in the end casing 5 for receipt by one of the pair of end-to-end aligned conductor bars 48 so as to complete a current path between the DC voltage source and field windings 20, as will also be described in greater detail when referring to FIG. 3. Inside assembly screws 50 (best shown in FIG. 7) are included to attach brush holders 28 to hubs 84 that surround the shaft 3 of motor 1 in accordance with an important feature of this invention.

Figure 3:
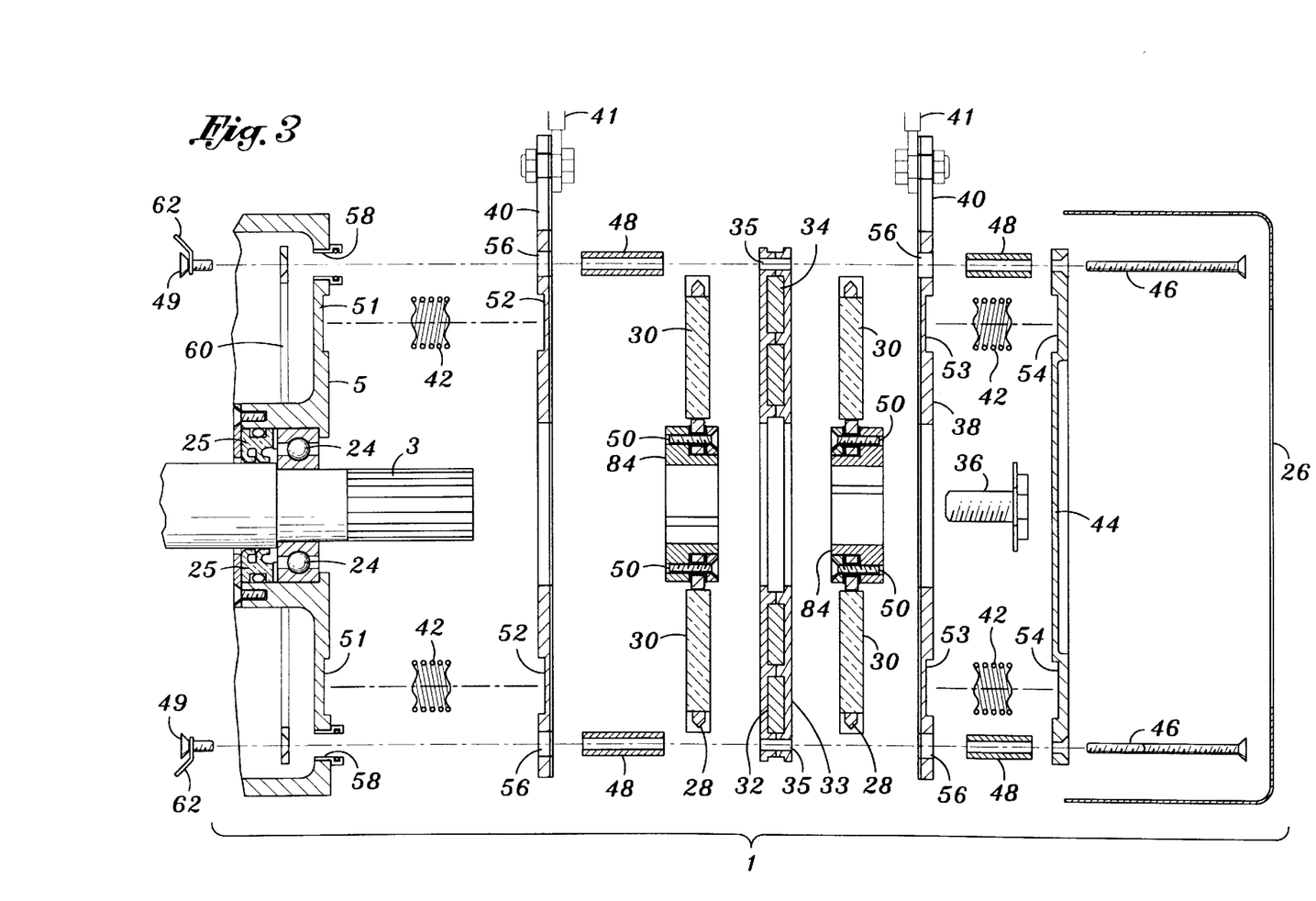
FIG. 3 is a cross-sectional, exploded view of the commutator, brush and slip ring assemblies of the DC motor of FIG. 1.

FIG. 3 of the drawings is an exploded view showing the double sided stationary commutator assembly having sets of commutator bars 32 and 33 mounted at opposite sides of the insulating commutator support ring 34. The double sided commutator assembly will be described in greater detail when referring to FIGS. 10–12. Located adjacent each side of the commutator assembly and carried on the motor shaft 3 are the pair of rotating brush assemblies, each of which including a brush holder 28 and three brushes 30. The brush holders 28, to be described in greater detail when referring to FIGS. 5–9, are electrically insulated from one another. Surrounding the brush assemblies are a pair of outer slip rings 38 that are held in constant contact against respective ones of the brush assemblies by means of slip ring tension springs 42. One set of slip ring tension springs 42 are received within opposing spring pockets 51 and 52 formed in the bearing supporting end casing 5 and one of the pair of slip rings 38. A second set of slip ring tension springs 42 are received within opposing spring pockets 53 and 54 that are formed in the other slip ring 38 and the outer end wall 44 of motor 1. As earlier described, the slip rings 38 have outwardly projecting electrical terminals 40 to which input power is provided from opposite terminals 41 of a DC voltage source (not shown).

The face-to-face relationship between the stationary commutator and slip ring assemblies with the rotating brush assemblies is maintained by the locking screw 36 and the outside assembly screws 46. The outside assembly screws 46 run through respective pairs of the hollow, end-to-end aligned electrically conductive bars 48 to complete a current path from the DC voltage source to the field windings of motor 1. That is, each outside assembly screw 46 extends longitudinally from the outer end wall of motor 1, through a pair of end-to-end aligned conductor bars 48, to be electrically connected to a tabbed assembly screw 48 at the insulated aperture 58 of bearing supporting end casing 5. As earlier described when referring to FIGS. 1 and 2 and as is best shown in FIG. 4, pairs of hollow end-to-end aligned conductor bars 48 are received by circumferentially spaced throughholes 56 that are formed around each of the pair of slip rings 38. As is also best shown in FIG. 4, the outside assembly screws 46 that run through the pairs of hollow conductor bars 48 are received in circumferentially spaced throughholes 35 that are formed around the commutator assembly and through opposing conductor bars 32 and 33 thereof.

Each pair of end-to-end aligned conductor bars 48 is electrically connected to a tabbed assembly screw 49 at an aperture 58 which is electrically insulated so as to isolate the assembly screws 49 from the metallic end casing 5. The tabbed assembly screws 49 are received by the insulated apertures 58 via an electrically insulated screw supporting ring 60. Each tabbed assembly screw 49 has a tab 62 projecting therefrom which functions as an electrical terminal for connection to an electric wire (not shown) that runs to the field windings of motor 1 to thereby complete the current carrying path from the DC source.

FIG. 4 of the drawings shows the position of the motor shaft 3 with regard to the face-to-face arrangement of the outer slip rings 38, the inner stationary commutator assembly, and the pair of rotating brush assemblies that are located therebetween. Each slip ring 38 includes a solid disc-like slip ring body 66 that is manufactured from an electrically conductive material. A round opening 68 is located at the center of the slip ring bodies 66 to receive the shaft 3. Electrical terminal 40 projects radially outward from each slip ring body 66. A hole 70 is formed through each electrical terminal 40 at which respective terminals (designated 41 in FIGS. 1 and 3) of a DC voltage source are connected by means of a screw or similar fastener.

Each slip ring 38 also includes a slip ring backing 72 that has a disc-like shape which is identical to the shape of the slip ring body 66. The slip ring backing 72 is manufactured from an electrically insulating (e.g. plastic) material and is affixed (e.g. laminated) to the electrically conductive slip ring body 66 to complete each of the slip rings 38. Slip ring backing 72 includes a round central opening 74 to receive the motor shaft 3 and a terminal support 76 projecting therefrom to provide a rigid support for the electrical terminal 40 of slip ring body 66. A hole 80 is formed through the terminal support 76 in order that a terminal 41 from the DC voltage source can be connected to the slip ring 38.

Each of the slip ring backings 72 has a set of spring pockets 52 and 53 spaced circumferentially therearound within which to accommodate the sets of slip ring tension springs (designated 42 and best shown in FIG. 3). Sets of axially aligned throughholes 56 are arranged circumferentially around the slip ring body and slip ring backing 66 and 72 to accommodate the hollow conductor bars (designated 48 and best shown in FIGS. 1 and 2).

Details of the pair of rotating brush assemblies, each of which including a brush holder 28 and a set of three brushes 30 will now be disclosed while referring to FIGS. 5–9 of the drawings. As previously indicated, each brush assembly is located between an outer one of the pair of slip rings 38 and one of the sets of commutator bars 32 and 33 at opposite sides of the commutator support ring 34. As was also indicated, the brush holders 28 from the pair of brush assemblies are electrically isolated from one another. Each brush holder 28 (only one of which being illustrated in FIGS. 5 and 6) is preferably manufactured from lightweight aluminum so as to be able to achieve a high rotational speed. Brush holder 28 includes three radially projecting arms that are uniformly spaced at 120 degrees apart. A brush cavity 82 is formed in each arm within which to slidably receive a flat, generally triangular shuntless brush 30. The brushes are loosely retained within the respective brush cavities 82 so as to be free to move therein towards the commutator assembly. In this regard, the slip rings 38 and the slip ring tension springs 42 cooperate to apply constant pressure against the brushes 30 to compensate for brush wear.

The brushes 30 are preferably manufactured from a graphite or a graphite/metal compound. The shuntless brushes 30 are devoid of any wire connections as is otherwise common to conventional motors and function in this invention as rotating electrical conductors between a slip ring 38 and one set of conductor bars 32 or 33 of the commutator assembly (best shown in FIG. 3). Because of their solid configuration, the entire surface of the brushes 30 can be used to advantageously achieve a high current carrying capacity.

Each brush holder 28 is mounted on the motor shaft 3 (best shown in FIG. 7) by means of a hub 84 that is retained at an opening 86 at the center of the brush holder 28. To properly align the brush holders 28 relative to one another (best shown in FIG. 13), the hub 84 has a set of keys 85 which are matched to splines on the motor shaft. In order to electrically isolate the brush holder 28 from its hub 84, a first plurality of insulating (e.g. plastic) bushings 88 are pushed in a first direction through respective bushing ports 90 that extend circumferentially around a central hub opening 86 of brush 28, whereby the brush holder will be spaced from its hub. A set of assembly screw holes 98 extend circumferentially around the hub 84 for a soon to be described purpose.

Figure 7:
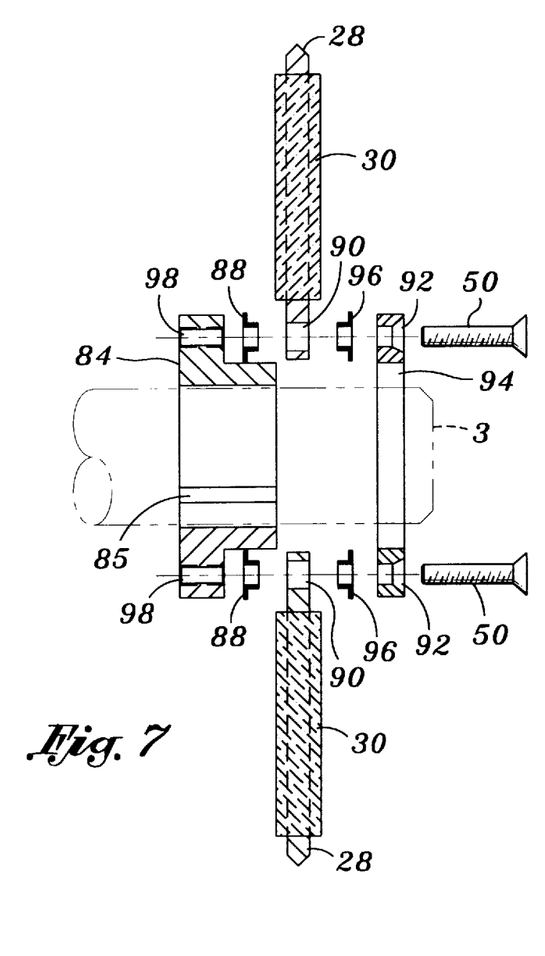
FIG. 7 illustrates the brush assembly of FIG. 6 mounted on the shaft of the DC motor of this invention.
Figure 8:
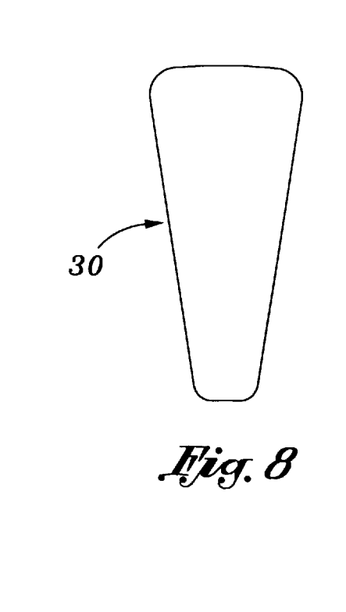
FIGS. 8 and 9 show front and side views, respectively, of a shuntless brush that is carried by the brush assembly of FIG. 6.
Figure 9:
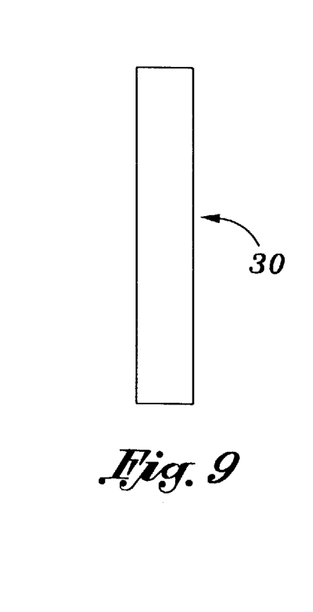

As shown in FIG. 7, a brush holder 28 is connected to a hub 84 that surrounds the motor shaft 3 by means of a set of inside assembly screws 50. The inside assembly screws 50 are received through respective assembly screw holes 92 that extend circumferentially around a screw retaining ring 94. A second set of insulating bushings 96 are pushed in an opposite direction through the bushing ports 90 of brush holder 28 to lie in opposing end-to-end alignment with the first set of insulating bushings 88. Bushings 96 keep the screw retaining ring 94 spaced above and electrically isolated from the brush holder 28. Accordingly, each one of the set of inner assembly screws 50 is received through a screw retaining hole 92 of screw retaining ring 94, opposing insulating bushings 88 and 96 within a bushing port 90 of brush holder 28, and a screw hole 96 in the hub 84. Moreover, the opposing, end-to-end aligned insulating bushings 88 and 96 located in the bushing ports 90 cause the brush holders 28 from the pair of brush assemblies (of FIG. 3) to be electrically isolated from one another.

Figures 10, 11:
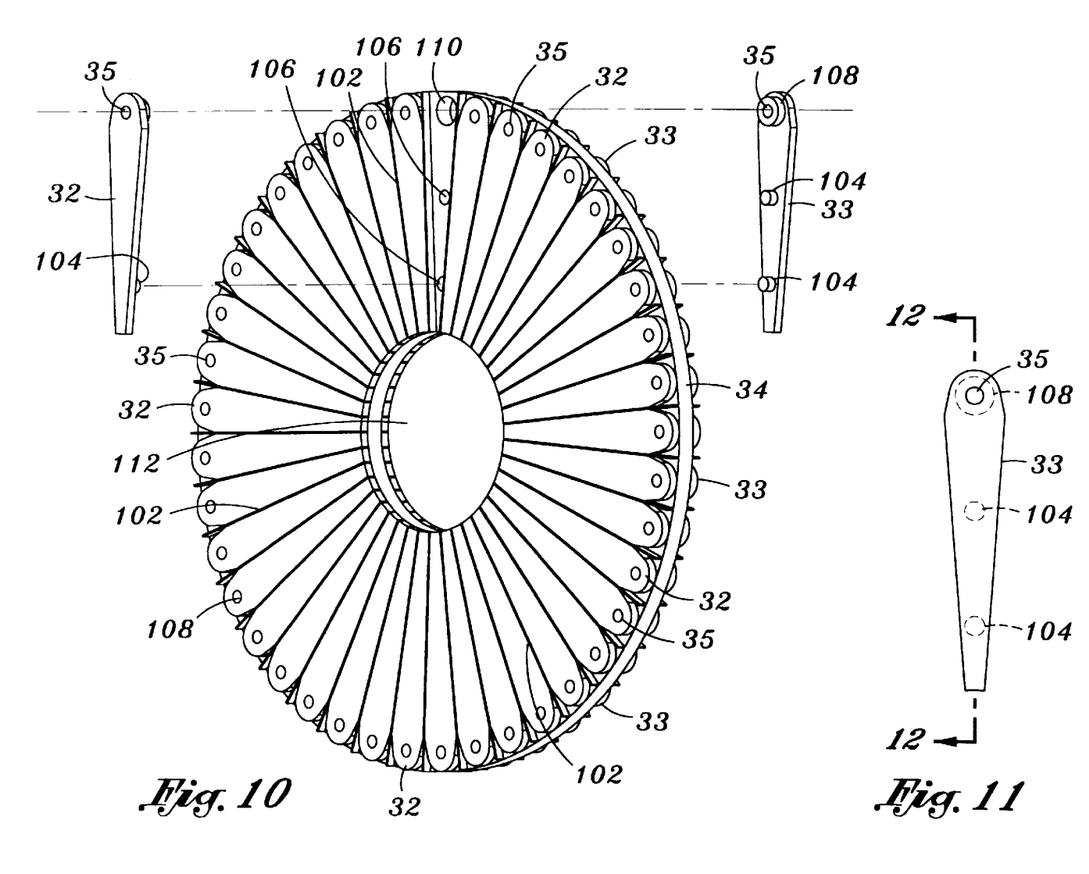
FIG. 10 illustrates the double sided commutator assembly which forms the DC motor this invention.
FIGS. 11 and 12 show front and side views, respectively, of one of a plurality of radially extending commutator bars that are mounted at opposite sides of the commutator assembly of FIG. 10.
Figure 12:
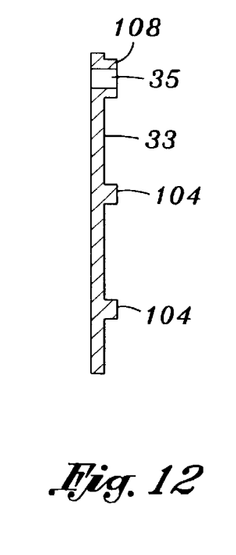

Details of the unique double sided commutator assembly for the motor 1 of FIG. 1 are now described while referring to FIGS. 10–12 of the drawings. As indicated above, the commutator assembly includes an electrically insulated support ring 34 that is manufactured from a non-conductive (e.g. plastic) material. Sets of radially extending electrically conductive (e.g. copper) commutator bars 32 and 33 are mounted around opposite sides of the support ring 34. At least two, but any number of commutator bars 32 and 33 may be mounted on the support ring 34. In the example shown in FIG. 10, a total of 41 commutator bars 32 and 33 are located at each side of support ring 34. The commutator bars 32 and 33 carried on the support ring 34 are spaced (i.e. insulated) from each other by means of a small (e.g. 0.02 inch) air gap 102 running therebetween.

To preserve their radial alignment on the support ring 34 and avoid a possible displacement of the sets of commutator bars 32 and 33 relative to one another, each commutator bar (e.g. designated 33 in FIGS. 11 and 12) includes a pair of alignment pins 104. The alignment pins 104 are sized to be received in corresponding alignment holes 106 formed in the support ring 34, whereby opposing pairs of the sets of commutator bars 32 and 33 will line up with one another. By virtue of the foregoing, the current carrying capacity of the commutator assembly of FIG. 10 can be doubled which is particularly advantageous in view of the small size of the motor 1. In this same regard, the aforementioned advantage of doubled current capacity is a significant improvement over conventional single face commutators which require that many brushes be interfaced with the same commutator face, with the result of undesirably maximizing space consumption and reducing motor efficiency.

At the top of each commutator bar 32 and 33 is a hollow register 108 that is sized to be received in a throughhole 110 located at the radially outmost edge of the commutator support ring 34. It is important that opposing pairs of commutator bars 32 and 33 line up on opposite sides of support ring 34 so that the respective hollow registers 108 thereof engage one another to establish a channel 35 (best shown in FIG. 3) for receipt of an outer assembly screw 46 (best shown in FIGS. 1 and 3) to thereby complete a current path through the commutator assembly from the pair of brush assemblies to the field windings of the motor.

As was also previously described when referring to FIGS. 1 and 3, the commutator assembly of FIG. 10 and the pair of slip ring assemblies are held stationary relative to the rotating brush assemblies. To this end, the double sided commutator assembly of this invention includes a central opening 112 that is sized to surround the shaft 3 of motor 1.

Figure 13:
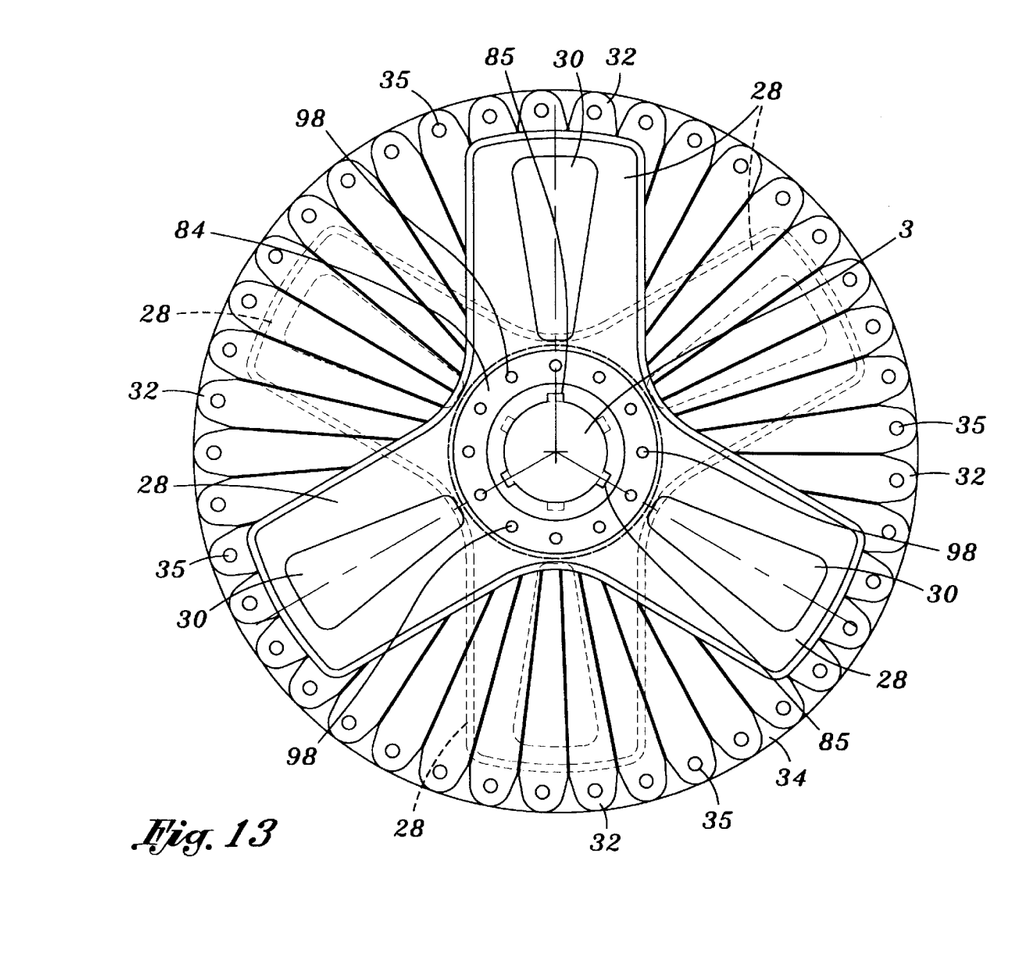
FIG. 13 shows the relationship of the commutator assembly of FIG. 10 to a pair of the brush assemblies of FIG. 6 that are located at opposite sides of the commutator assembly.

FIG. 13 of the drawings illustrates the positional relationship of the pair of rotating brush assemblies of FIGS. 5–9 at opposite sides of the stationary commutator assembly of FIGS. 10–12. Although the relationship illustrated in FIG. 13 is intended for a six pole motor, the number of poles may vary and is not to be considered a limitation of this invention. To produce a push-pull effect in response to the alternating magnetic field generated by the motor 1, the arms of the brush holders 28 of the pair of brush assemblies shown in FIG. 4 which carry brushes 30 are located 60 degrees out of phase. As was previously disclosed, the brush holders 28 that are mounted on the motor shaft 3 by means of their respective hubs 84 are electrically isolated from one another at opposite sides of the double sided commutator support ring 34 and the sets, of radially extending electrically conductive commutator bars 33 and 34 mounted thereon. As was also described, because of the constant pressure applied by the slip ring tension springs 42 against the slip rings 38 (of FIG. 3), the brushes 30 will be urged towards and into constant electrical contact with the commutator bars 33 and 34 as the brushes 30 of brush holders 28 rotate with the motor shaft 3 around the stationary commutator assembly.

In FIGS. 1–13, a DC rotating brush type motor 1 has been disclosed having a single stationary commutator assembly surrounded by a single pair of stationary slip ring assemblies with a single pair of rotating brush assemblies located therebetween. To increase the power output of the motor without significantly increasing its size, multiple (e.g. twin) commutator, slip ring and brush assemblies may be connected with one another in parallel. Such is the case for the motor 120 shown in FIG. 14 of the drawings. Motor 120 includes a first commutator assembly having sets of radially extending conductor bars 32-1 and 33-1 mounted on opposite sides of a commutator support ring 34-1, a first pair of slip rings 38-1, and a first pair of brush assemblies having brush holders 28-1 and brushes 30-1. Motor 120 also includes a second commutator assembly having sets of commutator bars 32-2 and 33-2 mounted on opposite sides of a commutator support ring 34-2, a second pair of slip rings 38-2, and a second pair of brush assemblies having brush holders 28-2 and brushes 30-2. Additional parallel interconnected sets of commutator, slip ring and brush assemblies, beyond the twin assemblies illustrated in FIG. 14, may also be included in the motor 120.

Figure 14:
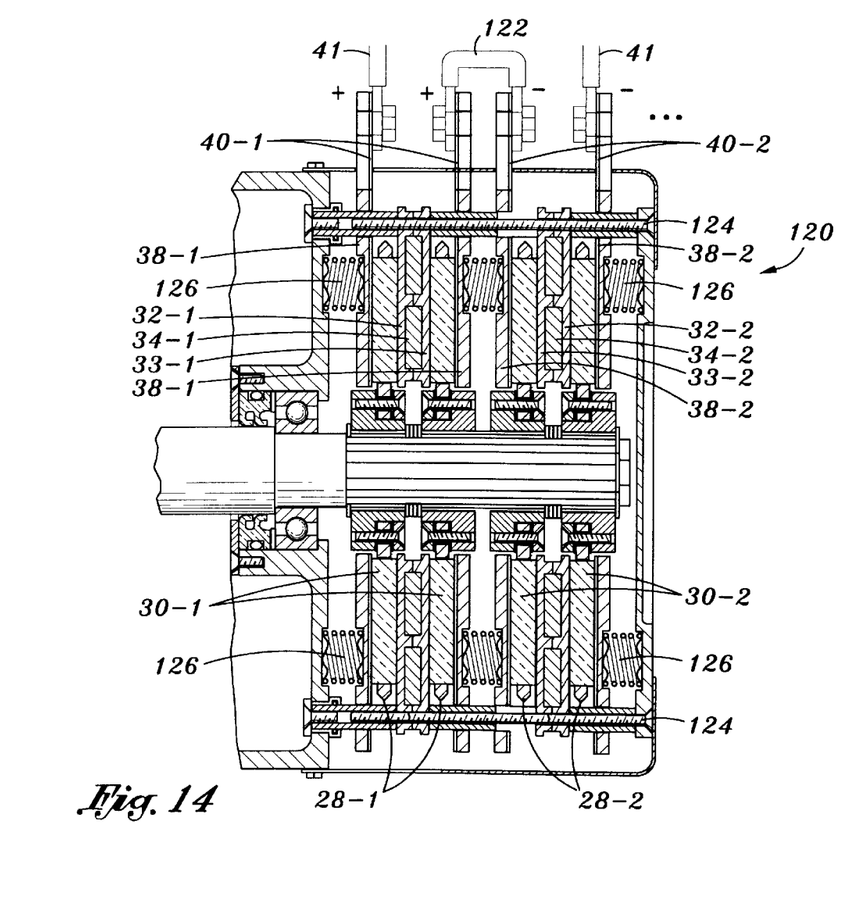
FIG. 14 shows a modification to the DC motor of FIGS. 1–13 so as to include multiple sets of commutator, brush and slip ring assemblies.

To provide DC input power to the multiple assemblies of the motor 120 of FIG. 14, electrical terminals 41 of opposite polarity from a DC voltage source (not shown) are connected to the outermost terminals 40-1 and 40-2 of the twin pairs of slip rings 38-1 and 38-2. A conductive strap 122 is connected between the innermost terminals 40-1 and 40-2 of the twin pairs of slip rings 38-1 and 38-2 to complete a current path to the field windings of motor 120. Accordingly, the current conducted by the parallel connected twin assemblies can be doubled resulting in a corresponding increase in motor torque.

Long outside assembly screws 124 (like those designated 46 in the motor 1 of FIGS. 1–13) run continuously through hollow conductor bars that extend through the twin stationary commutator and slip ring assemblies of motor 120. Slip ring tension springs 126 (like those designated 42 in FIGS. 1–13) are included to exert pressure against the twin pairs of slip rings 38-1 and 38-2 so as to maintain the brushes 30-1 and 30-2 of the twin pairs of rotating brush assemblies in constant electrical contact with the conductor bars 32-1, 33-1 and 32-2, 33-2 of the twin pairs of stationary commutator assemblies.

By virtue of the improvements described above, the DC brush type motors 1 and 120 of this invention are capable of a very high power-to-weight ratio. Because the motor commutation is accomplished mechanically by means of double sided stationary commutator assembly, the cost associated with and the heat generated by the typical transistor controlled motor commutation is advantageously avoided, while the efficiency of the motor is increased. In this same regard, the unique double sided commutator assembly cooperates with the shuntless bushes of a pair rotating brush assemblies to establish a relatively short, low impedance path between a DC voltage source and the field windings to maximize the current carrying capacity thereof.

I claim:

1. A motor to receive input power from a voltage source, said motor comprising:
   a rotatable shaft;
   a rotor coupled to said rotatable shaft, said rotor including first and second electrical current carrying brush assemblies;
   a stator fixedly positioned relative to said rotor, said stator including a set of electromagnetic field windings;
   first and second electrically conductive slip ring assemblies electrically connected between the voltage source and respective ones of said first and second brush assemblies; and a double sided commutator assembly located between said first and second brush assemblies and having electrical conductors on each side thereof, said first and second brush assemblies being rotated by said rotatable shaft relative to said first and second slip ring assemblies and said commutator assembly.

2. The motor recited in claim 1, wherein said voltage source is a DC voltage source having first and opposite terminals, said first and second slip ring assemblies respectively connected to said first and opposite terminals of said DC voltage source to provide input power to said motor.

3. The motor recited in claim 1, wherein said rotor also includes permanent magnets that are rotated by said shaft relative to the electromagnetic field windings of said stator.

4. The motor recited in claim 1, wherein the first and second slip ring assemblies and the electrical conductors on each side of said commutator assembly are electrically connected to one another to establish a current path between said voltage source and the electromagnetic field windings of said stator.

5. The motor recited in claim 4, further comprising a plurality of electrical conductors received through respective holes formed in each of said first and second slip ring assemblies and the electrical conductors on each side of said double sided commutator assembly, whereby said first and second slip ring assemblies and the electrical conductors on each side of said commutator assembly are electrically connected to one another and to the voltage source.

6. The motor recited in claim 1, wherein said double sided commutator assembly is located between and in face-to-face electrical contact with the first and second brush assemblies, such that respective ones of said first and second brush assemblies rotate over the electrical conductors on each side of said commutator assembly.

7. The motor recited in claim 6, wherein said first and second slip ring assemblies exert pressure on said first and second brush assemblies to hold said first and second brush assemblies against and in electrical contact with the electrical conductors on each side of said double sided commutator assembly.

8. The motor recited in claim 7, further comprising slip ring tension springs communicating with each of said first and second slip ring assemblies to cause said first and second slip ring assemblies to exert pressure on and urge said first and second brush assemblies towards the electrical conductors on each side of said double sided commutator assembly.

9. The motor recited in claim 1, wherein said double sided commutator assembly includes an electrically insulating conductor support ring having an opening for receipt of the rotatable shaft, said electrical conductors mounted on opposite sides of said conductor support ring.

10. The motor recited in claim 9, wherein said electrical conductors mounted on opposite sides of said conductor support ring include a first set of electrically conductive commutator bars insulated from one another and extending radially around a first side of said conductor support ring and a second set of electrically conductive commutator bars insulted from one another and extending radially around the opposite side of said conductor support ring.

11. The motor recited in claim 10, wherein said first and second sets of commutator bars are aligned face-to-face one another at opposite sides of said commutator support ring, opposing pairs of said first and second sets of commutator bars being electrically connected together through said commutator support ring.

12. The motor recited in claim 1, wherein each brush assembly of said first and second brush assemblies includes a brush holder having a hole through which to receive said rotatable shaft, a plurality of radially projecting arms, each of said arms having a brush cavity formed therein, and a corresponding plurality of shuntless electrically conductive brushes located within respective ones of said brush cavities.

13. The motor recited in claim 12, wherein said plurality of shuntless brushes are slidably received within said brush cavities, said first and second slip ring assemblies urging said plurality of brushes of said first and second brush assemblies to slide through said brush cavities and into electrical contact with the electrical conductors on each side of said double sided commutator assembly.

14. The motor recited in claim 12, wherein the plurality of radially projecting arms of the brush holder of said first brush assembly carried on said rotatable shaft are positioned out of alignment with the plurality of radially projecting arms of the brush holder of said second brush assembly.

15. The motor recited in claim 12, wherein each brush assembly of said first and second brush assemblies also includes a hub connected to said brush holder and received within the hole formed through said brush holder by which to mount said brush assembly on said rotatable shaft.

16. The motor recited in claim 15, wherein each brush assembly of said first and second brush assemblies also includes a plurality of insulating bushings located between said brush holder and said hub so as to electrically isolate said brush holder from said hub.

17. The motor recited in claim 16, wherein the brush holders of said first and second brush assemblies are electrically isolated from one another by means of said plurality of insulating bushing located between said brush holders and said hubs, said insulating bushings being received in respective bushing ports formed through said brush holders.

18. The motor recited in claim 1, wherein each slip ring assembly of said first and second slip ring assemblies includes a ring shaped electrically conductive body and a correspondingly ring shaped electrically insulating backing, said electrically insulating backing attached to said electrically conductive body and said electrically conductive body communicating with one of said first and second brush assemblies.

19. The motor recited in claim 18, wherein the ring shaped electrically conductive body of each slip ring assembly of said first and second slip ring assemblies has an electrical terminal projecting radially therefrom and a connector by which to connect the electrical terminal of said electrically conductive body to one terminal of the voltage source.

20. A DC motor to receive input power from a DC voltage source, said DC motor comprising:

a rotatable shaft;

a rotor coupled to said rotatable shaft, said rotor including first and second brush assemblies, each brush assembly of said first and second brush assemblies including a brush holder having a plurality of radially projecting arms, a brush cavity formed in each of said radially projecting arms and a shuntless electrically conductive brush located in each brush cavity;

a stator fixedly positioned relative to said rotor, said stator including a set of electromagnetic field winding;

first and second electrically conductive slip ring assemblies electrically connected between the DC voltage source and respective ones of said first and second brush assemblies; and a double sided commutator assembly located between said first and second brush assemblies and having a first set of electrically conductive commutator bars insulated from one another and mounted on one side of said commutator assembly, and a second set of electrically conductive commutator bars insulated from one another and mounted on the opposite side of said commutator assembly, said first and second brush assemblies being rotated by said rotatable shaft relative to said first and second slip ring assemblies and said commutator assembly.

* * * * *